United States Patent
Wong et al.

(10) Patent No.: US 7,567,062 B2
(45) Date of Patent: Jul. 28, 2009

(54) CHARGING CIRCUIT

(75) Inventors: Shih-Fang Wong, Taipei Hsien (TW); Tai-Chun Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 154 days.

(21) Appl. No.: 11/840,227

(22) Filed: Aug. 17, 2007

(65) Prior Publication Data

US 2008/0042622 A1 Feb. 21, 2008

(30) Foreign Application Priority Data

Aug. 18, 2006 (CN) .......................... 2006 1 0062188

(51) Int. Cl.
*H02J 7/04* (2006.01)
*H02J 7/16* (2006.01)

(52) U.S. Cl. ..................... 320/162; 320/163; 320/164

(58) Field of Classification Search ................. 320/134, 320/137, 162–164
See application file for complete search history.

(56) References Cited

U.S. PATENT DOCUMENTS

| | | | | |
|---|---|---|---|---|
| 5,990,665 A | * | 11/1999 | Kawata et al. | 320/162 |
| 6,118,248 A | | 9/2000 | Gartstein et al. | |
| 6,504,345 B2 | * | 1/2003 | Sakurai et al. | 320/162 |
| 7,274,171 B2 | * | 9/2007 | Nishida et al. | 320/137 |

* cited by examiner

*Primary Examiner*—Akm E Ullah
*Assistant Examiner*—Ramy Ramadan
(74) *Attorney, Agent, or Firm*—Frank R. Niranjan

(57) ABSTRACT

A charging circuit for charging a rechargeable battery (70) includes a charge management unit (40), a comparator (80) and a changeover switch (60). The changeover switch (60) includes a default state of connecting the rechargeable battery to the comparator (80), so that the comparator (80) produces a comparison result by comparing a battery voltage of the rechargeable battery (70) with a preset voltage threshold. The comparison result is transmitted to the charge management unit (40) and the charge management unit (40) controls the changeover switch (60) to switch from the default state to a controlled state if the battery voltage is less than the preset voltage threshold according to the comparison result. In the controlled state the changeover switch (60) connects the rechargeable battery (70) to the charge management unit (40), so that the charge management unit (40) charges the rechargeable battery (70).

4 Claims, 2 Drawing Sheets

CHARGING CIRCUIT

BACKGROUND

1. Technical Field

The present invention relates to a charging circuit.

2. Related Art

A great number of electronic devices employ rechargeable batteries to supply power. The rechargeable batteries can be recharged to their full capacities by specified chargers when the energy stored therein is depleted. Regardless of how much energy remains in the rechargeable batteries, the specified chargers recharge the batteries when the batteries have been placed into the specified chargers. Thus, if a rechargeable battery with an almost full charge is mistakenly placed into its specified charger, the almost fully charged battery will be charged. However, repeated recharge greatly shortens the work life of rechargeable batteries.

Further, if a rechargeable battery is not removed from the charger after being fully charged, the rechargeable battery will repeat self-discharge and recharge, thus, further shortening the work life of the rechargeable battery.

Therefore, there is a need for providing a charging circuit that can prevent the rechargeable battery from being recharged unnecessarily.

SUMMARY

A charging circuit for charging a rechargeable battery is provided with a preferred embodiment. The charging circuit includes a charge management unit, a comparator and a changeover switch. The changeover switch includes a default state of connecting the rechargeable battery to the comparator, so that the comparator produces a comparison result by comparing a battery voltage of the rechargeable battery with a preset voltage threshold. The comparison result is transmitted to the charge management unit and the charge management unit controls the changeover switch to switch from the default state to a controlled state if the battery voltage is less than the preset voltage threshold according to the comparison result. In the controlled state the changeover switch connects the rechargeable battery to the charge management unit, so that the charge management unit charges the rechargeable battery.

Other advantages and novel features will be drawn from the following detailed description with reference to the attached drawings.

DETAILED DESCRIPTION OF THE EMBODIMENTS

Figure 1:
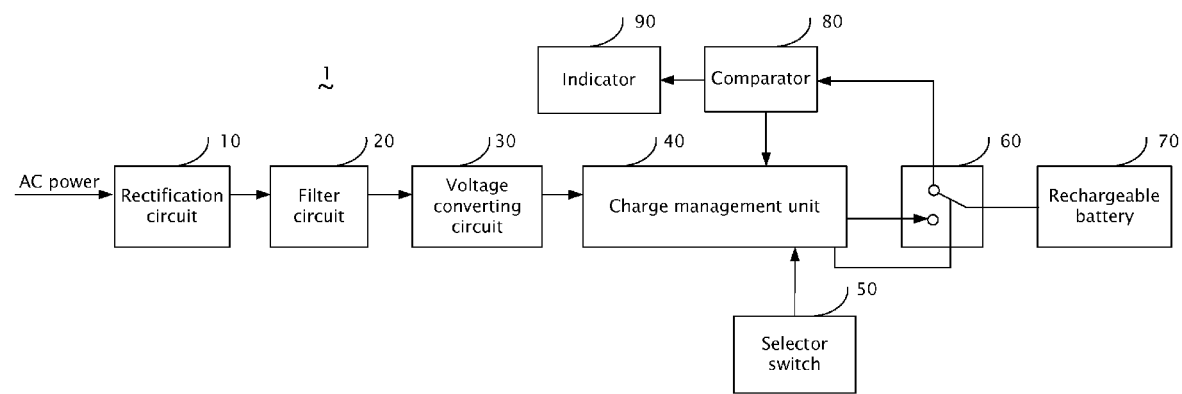
FIG. 1 is a block diagram of a charging circuit in accordance with a preferred embodiment of the present invention.

Referring to FIG. 1, a block diagram of a preferred embodiment of a charging circuit 1 is shown. The charging circuit 1 receives AC power and rectifies the AC power into DC power by employing a rectification circuit 10 and a filter circuit 20. The DC power is outputted to a voltage converting circuit 30 and outputted by the voltage converting circuit 30 with one or more predefined voltages. The predefined voltages are suitable for a charge management unit 40, a comparator 80 and other circuits and components of the charging circuit 1. The charge management unit 40 is used to manage charge of a rechargeable battery 70 that is connected to the charging circuit 1 for recharging. By way of example, the charge management unit 40 may sequentially initiate and terminate a constant current mode, a constant voltage mode, and a trickle charge mode if the chargeable battery 70 is a Li-ion rechargeable battery.

In the preferred embodiment, the charge management unit 40 is further used for determining whether to start recharging the rechargeable battery 70 when the rechargeable battery 70 is connected to the charging circuit 1. The charge management unit 40 receives a comparison result from the comparator 80 that compares a battery voltage of the rechargeable battery 70 with a preset voltage threshold, and controls a changeover switch 60 accordingly. In the preferred embodiment, the charge management unit 40 signals the changeover switch 60 to connect the rechargeable battery 70 to either the comparator 80 or the charge management unit 40. If the comparison result shows that the battery voltage is lower than the preset voltage threshold, the charge management unit 40 controls the changeover switch 60 to connect the rechargeable battery 70 to the charge management unit 40 and recharge the rechargeable battery 70. Otherwise, the changeover switch 60 connects the rechargeable battery 70 to the comparator 80. The changeover switch 60 in a typical application is a double-pole double-throw (DPDT) relay that has a default state of connecting the rechargeable battery 70 to the comparator 70. The DPDT relay is controlled by the charge management unit 40 from the default state to a controlled state of connecting the rechargeable battery 70 to the charge management unit 40 when the battery voltage is lower than the preset voltage threshold.

An indicator 90 is provided and connected with the comparator 80. The indicator 90 is used for indicating when the battery voltage reaches or exceeds the preset voltage threshold. A selector switch 50 is also provided and connected with the charge management unit 40. The selector switch 50 is used for signaling the charge management unit 40 to switch the changeover switch 60 from the default state to the controlled state even when the battery voltage reaches or exceeds the preset voltage threshold. Therefore, with such a configuration, the charging circuit 1 can automatically prevent the rechargeable battery 70 from recharging when the rechargeable battery 70 still has at least a predetermined amount of remaining energy, thus prolonging a work life of the rechargeable battery 70 by limiting repeated recharges. However, if it is still desired to recharge the rechargeable battery 70 when the rechargeable battery 70 still has a predetermined amount of remaining energy, the selector switch 50 can be actuated to switch the changeover switch 60 from the default state to the controlled state.

Figure 2:
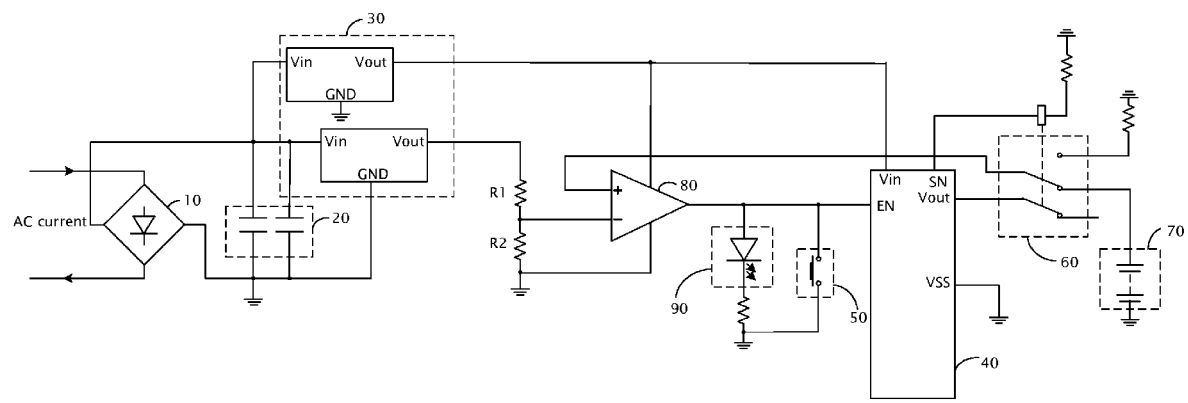
FIG. 2 is a circuit diagram of the charging circuit of FIG. 1.

Referring to FIG. 2, a circuit diagram of the charging circuit 1 is shown. The rectification circuit 10 employs a full bridge rectification circuit which is made up of diodes. The filter circuit 20 is constituted by two capacitors which are connected in parallel between a forward path (not labeled) and a grounded return path (not labeled) of the AC power. The voltage converting circuit 30 includes two direct current to direct current (DC to DC) converters. One DC to DC converter is configured for providing a suitable voltage to the charge management unit 40 and the comparator 80, and the other DC to DC converter is configured for providing a voltage to a voltage dividing circuit that produces the preset voltage threshold to the comparator 80.

The comparator 80 includes a non-inverting input used to receive the battery voltage via the changeover switch 60, and an inverting input used to receive the preset voltage threshold.

The comparator 80 outputs a high level if the battery voltage reaches or excesses the preset voltage threshold, and outputs a low level otherwise. The high level lights the indicator 90 which is a lighting emitting diode (LED). The low level is inputted to a low level enable port EN of the charge management unit 40. The low level enables the charge management unit 40 and the charge management unit 40 initiates and transmits control signals to the changeover switch 60 via a control port SN. In FIG. 2, the changeover switch 60 is a DPDT relay having a coil (not labeled) and two poles (not labeled). The control signals charge the coil and the coil magnetizes the poles when energized, thus changing the poles from a default state to a controlled state. In the default state, the poles connect the chargeable battery 70 to the comparator 80 and suspend an output power port Vout of the charge management unit 40. In the controlled state, the poles connect the chargeable battery 70 to the output power port Vout of the charge management unit 40 and ground the non-inverting input of the comparator 80 via a resistor (not labeled). The charge management unit 40 charges the chargeable battery 70 via the output power port Vout in the controlled state of the DPDT relay.

The charge management unit 40 charges the chargeable battery 70 employing either method. For example, if the chargeable battery 80 is a Li-ion rechargeable battery, the charge management unit 40 charges the Li-ion chargeable battery first in a constant current mode, then in a constant voltage mode and finally in a trickle mode. The charge management unit 40 monitors the battery voltage via other circuits (not shown) and sequentially initiates and terminates each mode based on the battery voltage. The charge management unit 40 terminates the control signals supplied to the changeover switch 60 when the chargeable battery 70 is fully charged. The changeover switch 60 accordingly rebounds to its default state and the comparator 80 continues to compare the battery voltage with the preset voltage threshold if the chargeable battery 70 is not removed from the charging circuit 1.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A charging circuit for charging a rechargeable battery, comprising:
   a changeover switch having a default state and a controlled state;
   a comparator configured for receiving a battery voltage from the rechargeable battery via the changeover switch when the changeover switch is at the default state, wherein the comparator compares the battery voltage with a preset voltage threshold and outputs a comparison result accordingly; and
   a charge management unit for receiving the comparison result and controlling the changeover switch to switch from the default state to the controlled state if the battery voltage is less than the preset voltage threshold according to the comparison result, wherein the charge management unit charges the rechargeable battery via the changeover switch when the changeover switch is at the controlled state;
   wherein the changeover switch is a double-pole double-throw relay.

2. The charging circuit as claimed in claim 1, further comprising an indicator for indicating if the battery voltage reaches or exceeds the preset voltage threshold according to the comparison result of the comparator.

3. The charging circuit as claimed in claim 1, further comprising a selector switch configured for signaling the charge management unit to control the changeover switch to switch from the default state to the controlled state when the battery voltage reaches or exceeds the preset voltage threshold.

4. The charging circuit as claimed in claim 1, wherein the charge management unit terminates to control the changeover switch and the changeover switch rebounds to the default switch when the charge is completed.

* * * * *